United States Patent [19]

Hasenauer et al.

[11] Patent Number: 5,422,941

[45] Date of Patent: Jun. 6, 1995

[54] EXTENSION OF CENTREX SERVICES

[75] Inventors: George Hasenauer, Greenbelt, Md.; William A. Kay, Glendora, N.J.; Von K. McConnell, Springfield, Va.

[73] Assignee: Bell Atlantic Network Services, Inc., Arlington, Va.

[21] Appl. No.: 80,191

[22] Filed: May 21, 1993

Related U.S. Application Data

[63] Continuation-in-part of Ser. No. 843,040, Feb. 28, 1992, Pat. No. 5,247,571.

[51] Int. Cl.[6] .................. H04M 3/42; H04M 7/14; H04Q 3/62
[52] U.S. Cl. .................. 379/207; 379/112; 379/212; 379/216; 379/225
[58] Field of Search ............. 379/207, 225, 212, 230, 379/112, 220, 269; 370/60, 60.1, 110.1

[56] References Cited

U.S. PATENT DOCUMENTS

| | | | |
|---|---|---|---|
| 4,139,739 | 2/1979 | von Meister et al. | 379/207 |
| 4,160,129 | 7/1979 | Peyser et al. | 379/220 |
| 4,191,860 | 3/1980 | Weber | 379/115 |
| 4,313,035 | 1/1982 | Jordan et al. | 379/207 |
| 4,313,036 | 1/1982 | Jabara et al. | 379/207 |
| 4,348,554 | 9/1982 | Asmuth | 379/113 |
| 4,600,812 | 7/1986 | Gerlits | 379/216 |
| 4,611,094 | 9/1986 | Asmuth et al. | 379/89 |
| 4,611,096 | 9/1986 | Asmuth et al. | 379/207 |
| 4,723,272 | 2/1988 | Maat | 379/211 |
| 4,726,056 | 2/1988 | An et al. | 379/115 |
| 4,754,479 | 6/1988 | Bicknell et al. | 379/207 |
| 4,756,020 | 7/1988 | Fodale | 379/112 |
| 4,757,267 | 7/1988 | Riskin | 379/113 |
| 4,788,718 | 11/1988 | McNabb et al. | 379/113 |
| 4,802,199 | 1/1989 | Lange et al. | 379/221 |
| 4,885,769 | 12/1989 | Bierle | 379/210 |
| 4,899,373 | 2/1990 | Lee et al. | 379/207 |
| 4,955,047 | 9/1990 | Morganstein et al. | 379/112 |
| 5,018,195 | 5/1991 | Hall | 379/225 |
| 5,027,341 | 6/1991 | Jarvis et al. | 370/13 |
| 5,339,356 | 8/1994 | Ishii | 379/234 |
| 5,357,564 | 10/1994 | Gupta et al. | 379/188 |

OTHER PUBLICATIONS

"Meeting Private Needs With The Public Network," L. Pierce et al., *Bellcore Exchange*, Jan./Feb. 1988, pp. 8–13.

"Evolution in Business Networking", M. Davis et al., *Telesis* 1988 pp. 23–31, Bell-Northern Research, Ltd. (Canada).

"The Building of Intelligent Networks . . . ", J. Dunogue et al., *Commutation & Transmission*, No. 2-1989, pp. 5–22, SOTELEC, Paris, France.

"Implementation of ISDN Wide Area Centrex in System 12", K. P. Lathia, *Electrical Communication*, vol. 63, No. 4, 1989, pp. 374–382.

AT&T Bell Laboratories, "Engineering and Operations in the Bell System," second edition, © 1983, pp. 414–439.

Bellcore Technical Publication TR-TSY-000402, Issue 2, Jul. 1989, pp. B-1 to B-54.

"Perspectives on the AIN Architecture", R. K. Berman et al., *IEEE Communications Magazine*, Feb. 1993, pp. 27–32.

*Primary Examiner*—Thomas W. Brown
*Attorney, Agent, or Firm*—Lowe, Price, LeBlanc & Becker

[57] ABSTRACT

A switching office translates a dialed extension number consisting of fewer digits than the minimum number normally required to identify a destination station into a Centrex number of at least the minimum number of digits. At least for those extension numbers identifying lines connected to a different switching office, the Centrex number triggers a query and response procedure to access data stored in a database in a central control. The accessed data is used to translate the Centrex number into an actual destination number uniquely identifying a particular communication line. The central control returns the destination number to the switching office for use in providing a requested communication service. Call processing methods and communication systems using these translations can extend a number of Centrex features, such as extension number dialing and extension number based call transfer, to a business subscriber's various premises served by different end offices.

37 Claims, 5 Drawing Sheets

EXTENSION OF CENTREX SERVICES

CROSS-REFERENCE TO RELATED APPLICATION

This application is a continuation-in-part of U.S. patent application Ser. No. 07/843,040 filed on Feb. 28, 1992, now U.S. Pat. No. 5,247,571, issued on Sep. 21, 1993, the disclosure of which is incorporated herein by reference.

TECHNICAL FIELD

The present invention relates to methods and system structures for providing private network service features to business customers with facilities at a number of geographically diverse locations through the public telephone network. The new service would extend customized extension number based Centrex service features to a multiple end office environment.

ACRONYMS

The written description uses a large number of acronyms to refer to various services and system components. Although known, use of several of these acronyms is not strictly standardized in the art. For purposes of this discussion, acronyms therefore will be defined as follows:

Area Wide Centrex (AWC)
Action Control Point (ACP)
Advanced Intelligent Network (AIN)
Advanced Services Platform (ASP)
Common Channel Inter-office Signalling (CCIS)
Data and Reporting System (DRS)
Individual Dialing Plan (IDP)
Integrated Service Control Point (ISCP)
North American Numbering Plan (NANP)
Private Branch Exchange (PBX)
Private Automatic Branch Exchange (PABX)
Service Control Point (SCP)
Service Creation Environment (SCE)
Service Circuit Node (SCN)
Service Management System (SMS)
Service Switching Point (SSP)
Signaling Transfer Point (STP)
Station Message Detail Recording (SMDR)
Transaction Capabilities Applications Protocol (TCAP)

BACKGROUND ART

In the past, providing advanced communications features to large companies with facilities at different locations required interconnection of a number of privately owned exchanges. U.S. Pat. No. 4,802,199 issued Jan. 31, 1989, to Michael D. Lange et al., for example, discloses a multiple exchange system aimed at the needs of large customers having facilities at a number of different geographic locations. The system provides repertory dialing through the switched network to set up connections between the different PBX's to emulate a dedicated private line connection. The system supports speed or repertory dialing, SMDR reporting and automatic routing features. The requisite processing capability for setting up the virtual private line connections between exchanges and providing special service features is located in the individual private exchanges. The problem with this approach is that the company must own, operate and maintain some form of private exchange at each of its locations. Also, in the Lange et al. system, the exchanges are PBX's interconnected via public or private switched network lines, and the company incurs the expense of these lines as well.

Rather than providing business services through a private exchange, such as a PBX, Centrex takes a group of normal telephone lines and provides call processing to add business features to the otherwise standard telephone lines. For example, the Centrex exchange adds intercom capabilities to the lines of a specified business group so that a business customer can dial other stations within the same group using extension numbers, such as a two, three or four digit numbers, instead of the full telephone number associated with each called line or station. Other examples of Centrex service features include call transfer between users at different stations of the business group, a number of varieties of call forwarding and speed calling. Thus, Centrex is a package of features that are placed or added onto the standard service provided via telephone lines that allow a group of lines assigned to a business customer to operate as a business system. Centrex typically provides business services similar to those provided by a PBX or PABX through a central office exchange of the public telephone network but without requiring the customer to purchase and maintain a private exchange.

Problems with the existing Centrex arise from the fact that Centrex features are provided individually by local switching offices. Consider switch based Centrex call transfer as one example. In the existing service, a business customer receives a call on one line but decides the caller should talk to an employee on another line. The currently connected individual could flash the switch hook and dial the second employee's extension number and hang up. The call is transferred by the central office over to the line of the second employee. If provided by a prior art Centrex, the transfer is confined to one central office. Consequently, the transfer feature works only so long as all of the employees of the particular business customer are served by the same central office. With such a service, a call cannot be transferred to a line connected to a remote office.

One way the problem of multiple locations has been addressed in the past is for the customer to purchase private tie line trunk circuits to connect remote facilities to the customer's exchange. In effect, when a remote employee wanted to call through the network to another employee, the remote employee took the station set off-hook and the set connected through a tie line to the distant exchange which provides the customer with the Centrex service. The calling employee then received the dial tone of the distant exchange via the tie line. Using digital switches, to achieve a similar result requires deployment of a remote switching module at the remote locations to supply foreign dial tone and connect the remote switching modules to the distant exchange via a fiber optic trunk. Every prior art system for extending Centrex type services to distant customer facilities therefore involves some form of private line to the remote locations. Use of any such private lines incurs mileage charges for the wires strung from the exchange to each distant extension.

Another problem relating to existing business services is illustrated by call routing. This type of service for outgoing calls selects one of three different line or trunk groups to place a call through. For a call from one city going to a distant city there might be a choice of going first via a Tie line, second to MCI and then to some kind of AT&T WATS line. Typically, a customer uses such call routing to control communication costs. The selection is made on a priority basis established by the customer in whatever manner produces the most economical use of their facilities. In the existing network, however, such call routing is controlled at the central office level of the network. The route selection priority for each Centrex line is programmed in the central office to which the line connects, and changing the priority for any given line requires a technician to go out to the central office switch and change the wiring and/or programming of that particular switch. Thus, if a business customer has multiple geographic locations connected to different central offices, if the customer desires to change the call routing priority for all locations, technicians would have to modify wiring and/or install another program table in each central office to which that customer's telephone lines connect.

Where the customer has a large number of lines to stations dispersed over a variety of geographic locations, typically a number of lines connect to one local central office and other lines connect to one or more remotely located central offices. In such a situation, some services, such as the call transfer discussed above, cannot be provided for all lines. Also, those services that can be provided require extensive programming and/or wiring at each connected central office switch to establish or change the service parameters as was discussed above with regard to call routing. Thus clearly a need exists for providing business type features to customers with facilities at a number of geographically diverse locations through the public telephone network.

In recent years, a number of new service features have been provided by an Advanced Intelligent Network (AIN). In an AIN type system, central offices send and receive data messages from an Integrated Services Control Point (ISCP) via a Switching Transfer Point (STP). At least some calls are then controlled through multiple central office switches using data retrieved from a database in the ISCP. Some attempts have been made to provide Centrex or closely related private virtual network services using AIN type architectures.

An Area Wide Centrex service using an AIN type network implementation was proposed in commonly assigned U.S. Pat. No. 5,247,571. With the system disclosed in that application, a number of the local communication lines connected to each central office switching system are designated as members of a business group for a particular customer. For each requested service feature, including extension number dialing, one of the central offices accesses a database in the integrated services control point (ISCP). Establishing or changing services for one or all of a particular customer's lines requires only reprogramming that customer's data in the central database, without the need to reprogram each central office switch. Also, Centrex services such as extension number type intercom dialing and call transfer, which could be provided only between lines connected to the same exchange were extended across exchanges.

The prior patent teaches accessing the database using a dialed extension number which consists of fewer than the minimum number of digits required for a complete telephone number. This facilitates extension number dialing using three, four or five digits, rather than requiring seven or ten digit dialing. However, feature conflict problems arose with this approach. Specifically, switch vendors maintain that to avoid conflicts in call processing routines an Area Wide Centrex line which can have the short number extension dialing must not have any other features associated with that line in the connected end office switch. This means that the business customer can subscribe to Area Wide Centrex but cannot also subscribe to any switch provided features, such as call forwarding or call pickup.

A system providing private virtual network services, similar to the above discussed Area Wide Centrex Service was described in Pierce et al., "Meeting Private Needs with the Public Network," Bellcore Exchange, Jan/Feb 1988, pp. 8-13. The private virtual network system of Pierce et al. and other similar systems use at least a full seven digit number as the extension numbers because many existing switches are not programmed to initiate the query and response procedure with a central database using only short extension numbers. Such switches require dialing of complete seven or ten digit telephone numbers prior to initiating the database communication procedure. Many customers, however, want to be able to use shorter extension numbers in a manner similar to that provided by many PBX dialing plans.

From the above discussion, it should be clear that a need still exists to develop an AIN type system which can provide short number extension dialing and similar Centrex type services through multiple end offices without requiring the line to have no associated switch provided type services which may cause call processing conflicts and which will allow use of switch programs set up to process AIN type calls using a complete seven or ten digit dialed telephone number.

DISCLOSURE OF THE INVENTION

The present invention overcomes the above noted problems by utilizing two separate translation steps performed in different elements of the system. A switching office receiving a short extension number as part of a request for service uses Centrex translation data stored therein to translate the extension number into another number, referred to as a composite number or as a Centrex number. Additional translation can be performed, if needed, by AIN processing via a central control, such as an integrated services control point.

The composite number or Centrex number produced by the translation in the switching office will consist of at least the minimum number of digits normally necessary to uniquely identify a destination line. Typically, the dialed extension number forms part of the composite or Centrex number. For at least those extension numbers corresponding to lines connected to a different switching office the composite or Centrex number triggers AIN processing.

The invention therefore comprises methods and communication systems for providing switched communication services. Switching offices selectively provide switched communication services over a plurality of communication lines. At least one of the communication lines connected to each of two of the switching offices is designated as a member of a business group assigned to a single subscriber. A central control, separate from the switching offices, sends data to and receives data from the switching offices to control at least some switching operations thereof. A request for service includes a dialed extension number consisting of a predetermined number of digits fewer than a minimum number of digits necessary to completely identify a communication line. When a request for service is received at one of the switching offices via a first one of the lines of the business group, the one switching office accesses Centrex translation data stored therein to convert the dialed extension number to a Centrex or composite number. The Centrex number consists of at least the minimum number of digits necessary to identify a destination. In at least some cases, the Centrex number is formatted to trigger transmission of the Centrex number to the central control. The central control accesses translation data stored therein to translate the Centrex number into an actual destination number. The central control transmits the destination number to the one switching office; and a switched communication service is provided using the destination number.

In one embodiment, the translation in the switching office will always trigger subsequent AIN processing. In a second embodiment, the composite or Centrex number will identify a destination station if the extension number corresponds to a line connected to the switching office receiving the request for service. If the dialed extension number corresponds to a line connected to a different switching office, then the composite or Centrex number is formatted to trigger AIN processing.

The communication system and methods of the present invention can provide a number of different communication services using extension number dialing. Typically, the extension number dialing produces a two-way communication link between the line over which the request for service originated and the line identified by the destination number. In one alternative, an existing call connection is transferred from the first line to the second line.

In the preferred embodiments disclosed herein, the communication lines are telephone lines, the switching offices are central office telephone switching systems and the call connections are telephonic connections. The switching systems storing the Centrex translation data may be end offices and/or tandem offices.

Because the central office switching systems still rely on internal translation data, those offices can still provide other switch provided special services to the lines of the business group utilizing the extension number dialing plan, such as call forwarding and call pickup. Also, because of the use of Centrex translation data in the switch prior to triggering, existing switches can be used which require a seven or ten digit number for AIN processing. Because at least some translations are performed using centralized data, the extension dialing plan can extend across switching office boundaries, thereby permitting one business customer with a number of geographically remote locations to use a common extension number dialing plan for all locations. The database in the central control can provide data for a variety of related service features, such as customized routing control. Also, changes in common data only need to be entered once, in the database in the central control.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
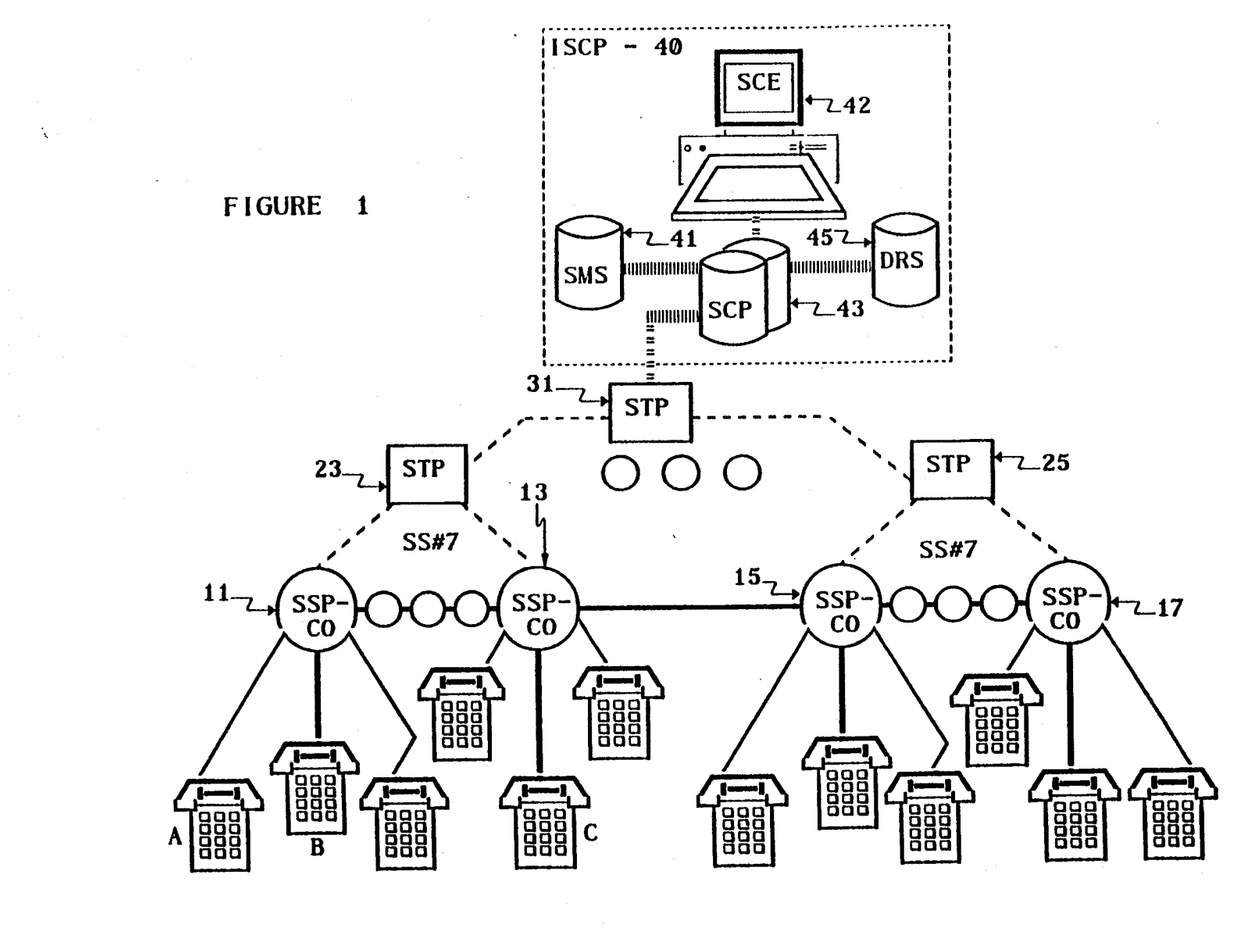
FIG. 1 is a schematic block diagram of the components of an Advanced Intelligent Network architecture of the preferred embodiment of the system for implementing the present invention.

For convenience, the extended Centrex service provided by the present invention will at times be referred to as "Centrex Extend" service. FIG. 1 illustrates one preferred telephone network architecture for providing the various features of Centrex Extend and associated services of the present invention. A number of other network architectures can also be used, as discussed in more detail later.

In the system shown in FIG. 1, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1, all of the central office switches 11, 13, 15 and 17 are equipped and programmed to serve as SSP's. The illustrated embodiment is perhaps an ideal implementation which would make a variety of Advance Intelligent Network AIN services widely available at the local office level throughout the network. As will be discussed later, other AIN implementations provide the SSP functionality only at selected points in the network, and end offices without such functionality forward calls to one of the SSP's.

SSP capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's. The structure of an exemplary CO which may serve as the SSP type CO's in the system of FIG. 1 will be discussed in more detail below, with regard to FIG. 2.

With reference to FIG. 1, the SSP type CO's 11 and 13 connect to a first local area STP 23, and the SSPCO's 15 and 17 connect to a second local area STP 25. The connections to the STP's are for signalling purposes. As indicated by the circles below STP's 23 and 25, each local area STP can connect to a large number of the SSP-CO's. The central office SSP's are interconnected to each other by trunk circuits (illustrated in FIG. 1 as bold lines) for carrying telephone services.

The local area STP's 23 and 25, and any number of other such local area STP's shown as circles between STP's 23 and 25 communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches.

The links between the central office switching systems (CO's) and the local area STP's 23 and 25 are typically SS#7type CCIS interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

As shown in FIG. 1, the ISCP 40 is an integrated system. Among other system components, the ISCP 40 includes a Service Management System (SMS) 41, a Data and Reporting System (DRS) 45 and the actual database referred to as a Service Control Point (SCP) 43. The ISCP also typically includes a terminal subsystem referred to as a Service Creation Environment or SCE 42 for programming the database in the SCP 43 for the services subscribed to by each individual business customer.

Although shown as telephones in FIG. 1, the terminals can comprise any communication device compatible with the line. Where the line is a standard voice grade telephone line, for example, the terminals could include facsimile devices, modems etc.

Figure 2:
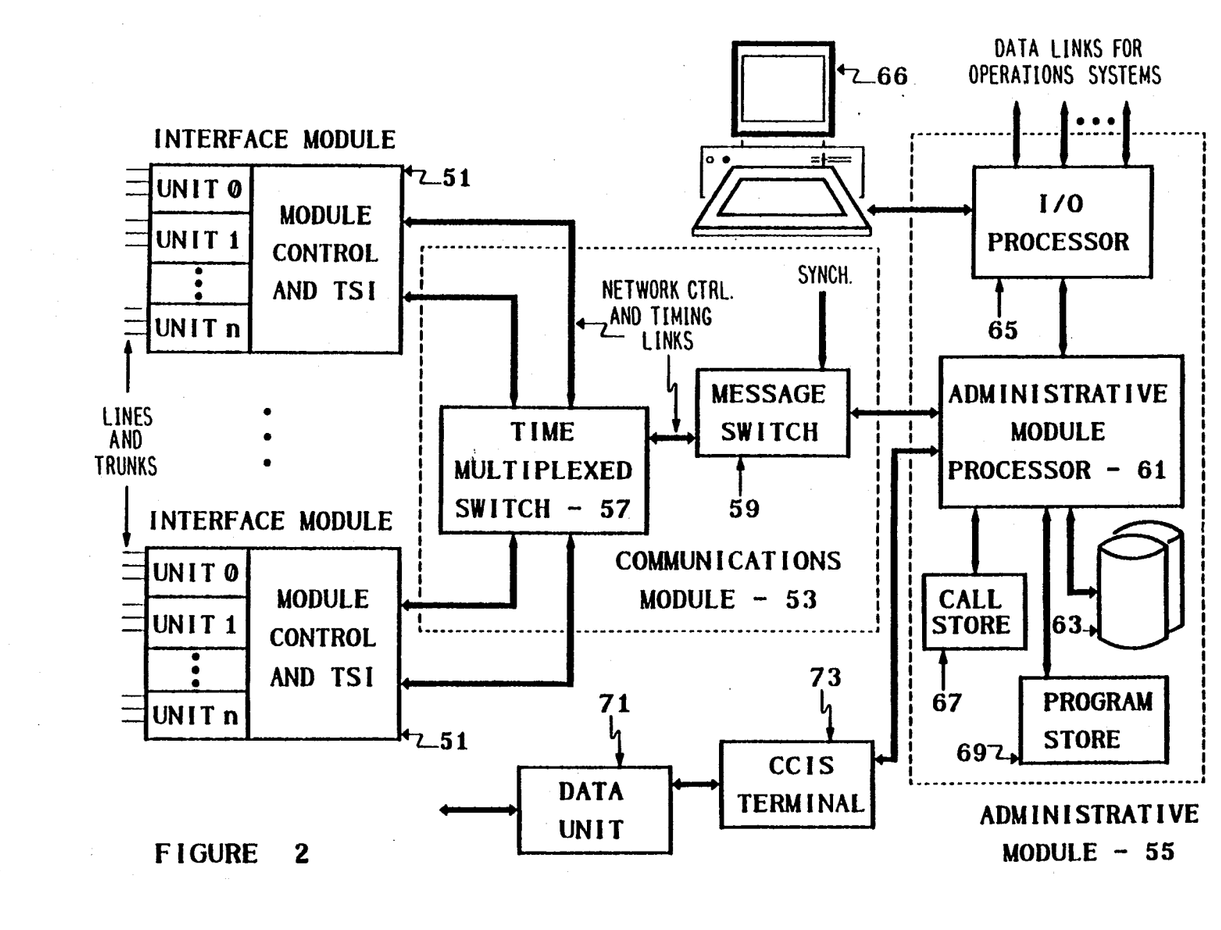
FIG. 2 is a more detailed diagram of one of the SSP type central offices used in the preferred intelligent network implementation of the present invention.

FIG. 2 is a simplified block diagram of an electronic program controlled switch which may be used as any one of the SSP type CO's in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see FIG. 1), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call.

For example, for a switch based Centrex service, the call store 67 would receive and store extension number translation information for the business customer corresponding to an off-hook line initiating a call. The program store 69 stores program instructions which direct operations of the computer serving as the administrative module processor.

Each SSP type central office switching system or CO shown in FIG. 1 normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so infolds the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between stations. In an AIN type network system implementing the extended Centrex features, such as extension number dialing and call transfer, these normal call processing routines would still be executed for completion of calls between Centrex Extend customer stations and other stations and for completing calls originating from the other subscribers's stations.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network detect a call processing event identified as an AIN "trigger". For ordinary telephone service calls, there would be no event to trigger AIN processing; and the local and toll office switches would function normally and process such calls as discussed above, without referring to the SCP database for instructions. An SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link and STP(s). The SSP then uses the call control message to complete the particular call through the network. To overcome the various problems with the prior art discussed above, and provide an extension dialing type access to ISCP provided services using relatively short extension number, the present invention uses a very specific processing routine in the SSP type CO's to produce and respond to a triggering event.

The SSP type switches can recognize a variety of events as triggers for activating a query and response type AIN interaction with the ISCP. A number of different AIN triggers can be used in accord with the present invention. The preferred embodiment, however, uses an Individual Dialing Plan (IDP) type trigger, as explained in more detail below.

The Centrex Extend call processing routines discussed below allow callers using lines connected to geographically remote CO's to dial across CO boundaries to parties on other company lines using a common extension number dialing plan using fewer than seven digits, e.g. for extension dialing intercom services and extension number based call transfer. For example, assume that in FIG. 1 the SSP type CO 11 is located in Washington, D.C. and that an employee John Doe uses a telephone A in that city which is assigned extension number 1234. His actual telephone number might be 201-456-7890. To call John Doe, any other employee of company X would only have to dial extension 1234, and the translations in the SSP-CO 11 and/or the ISCP 40 provide the full 201-456-7890 number to complete the call to John Doe's telephone line in his Washington office. This would be true whether the other employee was calling from an office in Richmond, for example using station C connected to SSP-CO 13 or from any company line connected to any of the other CO's 11, 15 and 17. In the example given, the four-digit extension number is an arbitrary number unrelated to the actual telephone number of the employee's telephone line. Alternatively, the extension number could be a selected subset of the digits of the actual telephone number, for example the last four digits.

For an Area Wide Centrex type service relying entirely on the ISCP, such as disclosed in U.S. Pat. No. 5,247,571, every call from a line designated as a member of the group triggers a query and response procedure to access data in the SCP database. The switching offices stored no data at all related to any specific Area Wide Centrex features or any other services to be provided to any particular line in the group. In contrast, the Centrex Extend service of the present invention relies on the switch to maintain a Centrex table and/or other service feature data related to each line. The Centrex table will store data necessary for triggering access to the ISCP for extension dialing services and can store service feature data for other services the business customer may currently subscribe to. For example, in the second call processing embodiment (FIG. 4) the Centrex table in the CO would store translations for routing on extension numbers to subscriber lines connected to the same CO without communication with the ISCP, as well as the data for converting extension numbers for stations connected to a remote CO into a seven or ten digit number format which will trigger AIN processing.

Because the system still uses stored data in the CO, the system can still offer customers switch provided services, such as call forwarding, on a line by line basis, even if the subscriber's lines are members of a Centrex Extend group. Also, business customers can subscribe to a call pickup service, and all data for providing that service would reside in the individual CO connected to the lines at each particular business location. For this service feature, when a call is ringing at one telephone, an employee hearing the ringing can pick up a different telephone at the same location and dial a specific code, such as "*9". The connected CO would recognize the code as a "call pickup" request and connect the incoming call producing the ringing to the particular telephone the employee actually used. Since for call pickup, it is desirable for the employee to actually hear the ringing, the service by definition would be limited to the specific location receiving the call. Each such location would necessarily be serviced by a single central office switching system. For example, an employee hearing telephone A ring, might use call pickup to answer the call from telephone B in the same office complex. Both telephones A and B are served by SSP-CO 11. However, there would be no way for a party at a remote location using telephone C to know that telephone A was ringing and normally there would be no reasons for call pickup to permit pickup of calls to telephones A or B by telephone station C. Accordingly, the SSP-CO 13 might provide call pickup among a subscriber's telephone lines connected to that one CO, but would not provide call pickup of calls ringing on telephone lines connected to other CO's.

The intelligent network of the present invention provides a variety of Centrex type services, for example extension number dialing, call transfer and call pickup. To select from among these different available services, a person using one of the business subscriber's lines requests service by simply taking the station set off-hook and inputting the necessary dialing information. For example, for extension number dialing, the caller goes off-hook and dials an extension number. If the station is already engaged in a telephone connection, the person requests the relevant Centrex service by momentarily operating the hookswitch ("hookflash") and then dialing in the necessary digits, e.g. to effect call transfer.

Centrex Extend Call Processing—First Embodiment

Figure 3:
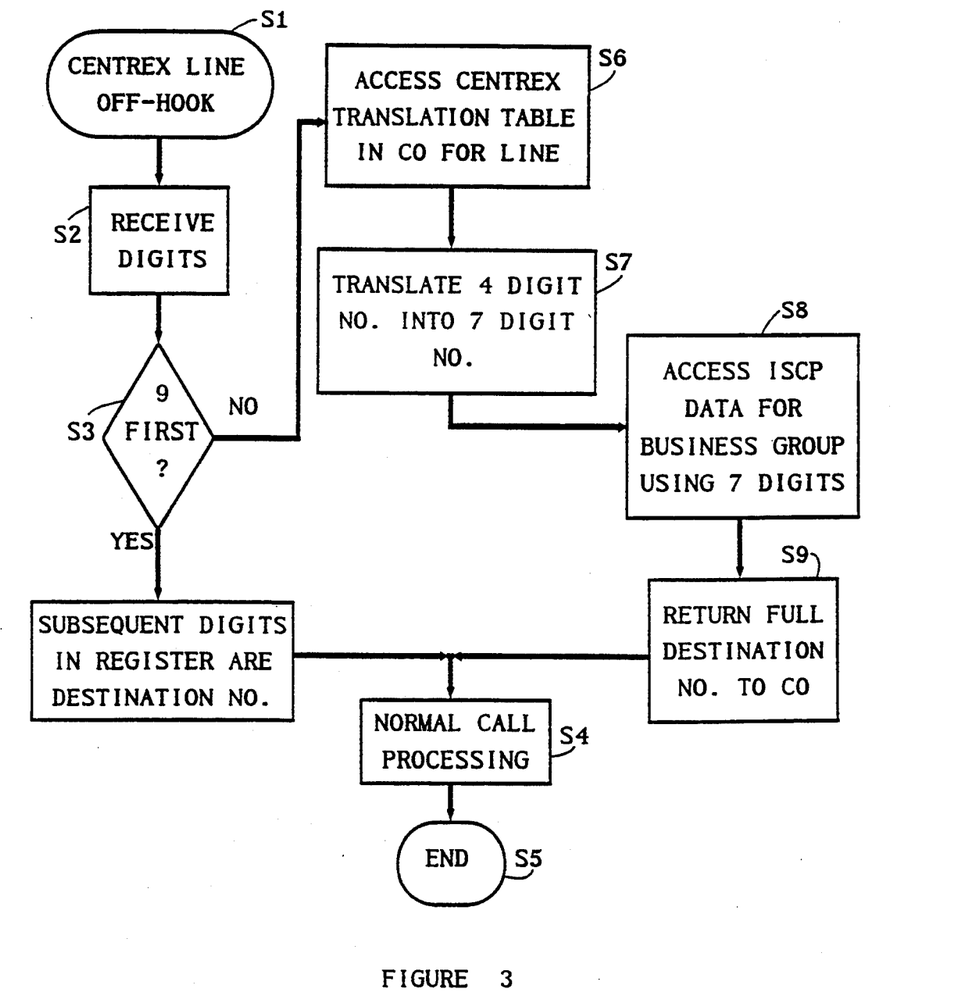
FIG. 3 is a flow chart depicting one example of call processing for extension number dialing in accord with the present invention.

FIG. 3 is a simplified flow diagram illustrating a first embodiment of call processing for extension number dialing in accord with the present invention. If a subscriber takes the station set on a non-Centrex line off-hook, the switch will process that subscriber's call in a normal manner, as discussed above. Centrex Extend call processing begins at step S1 when a Centrex customer takes the station set off-hook. The CO connected to the line has stored translation tables which include a variety of data regarding the various services associated with each line. In this case, the CO translation table indicates that the Off-Hook line is a Centrex line.

More specifically, each time a line goes off-hook, the administrative module processor 61 of the connected CO (FIG. 2) identifies the line and uses the line identification to load various translation information regarding the line from disc storage 63 into a portion of the call store 67 which is assigned to the line for the duration of processing of the particular call. The administrative module processor 61 also opens an internal register (not shown) for collecting dialed digits.

If the information in the call store 67 for the off-hook line indicates that the line is a Centrex line, the translation information provides an access code which is loaded into the digit register together with the actual dialed digits received. The access code identifies the call as a Centrex call for purposes of further processing discussed below. The access code may take any form and may include one or more digits. One example of such a code would be "*50", and typically the administrative module processor loads the access code digits into the open register ahead of the actual dialed digits.

In step S2 in FIG. 3 the connected CO receives dialed digits on the off-hook Centrex line. Next, at step S3, the CO checks to see if the first dialed digit is a 9, or any specified digit. In this case, if 9 is dialed first, the switch knows that the subsequently dialed digits represent a destination number. In step S4 the CO uses the dialed destination number digits in the open register to set up an outgoing direct dialed call using normal call processing routines, and call processing ends at step S5. If at step S3 the administrative processor module of the CO switch determines that the first dialed digit is not a 9, the processor knows that the caller intends to use an individual dialing plan, therefore call processing branches to step S6.

Other branching procedures can be used in the decision step S3. For example, as an alternative to using the leading "9" digit to identify calls directed out of the Centrex group, the administrative processor module of the connected CO switch could use a digit collection and time out analysis. If the Centrex caller dials fewer than seven digits and then stops dialing for some predetermined period of time, the switch processes the call as a Centrex type extension dialing call. If the caller dials seven or more digits without the predetermined period expiring between any two of the digits, the switch sets up a call outside the Centrex Group as a normal direct dialed call.

Returning to the specific example shown in FIG. 3, for an extension dialing call, processing has branched to step S6. For purposes of this discussion, it is assumed that the customer's individual dialing plan uses four digits, but shorter or longer digit strings could be used.

Normally, a minimum number of digits are necessary to uniquely identify a destination station or line, e.g. seven digits for local calls or ten digits for long distance calls. The "extension" numbers each consist of a predetermined number of digits, wherein the predetermined number is less than the minimum number necessary to identify a destination. Typically, the system can offer each subscriber the option to set up their own private dialing plan using three, four or five digits. Depending on the dialing plan used, two of which will be discussed later, the digits may be selected digits from the actual telephone number assigned to the called station or a number totally independent from the telephone number of the called station.

In step S6, the CO uses the Centrex code and dialed extension number to access its internal Centrex translation table associated with the off-hook line. Using the accessed data, the CO translates the 4 digit extension number dialed by the caller into a composite or 'Centrex' number which is a full telephone length number, e.g. seven or ten digits with, at times, part of the digit stream being arbitrary numbers that may or may not conform to the North American Dialing Plan. In the specific preferred embodiment, the CO translates the 4 digit extension number in the digit register into a 7 digit number.

For subscribers to the Centrex Extend service, the 7 digit number produced by the translation in step S7 will have a very specific format. The 7 digit number will include the dialed digits at the end, but the first digits of the number will be chosen to cause AIN triggering. Assuming that the extension number comprises 4 digits, the translation will add three digits in the NXX positions at the beginning of the number. For example, if the caller dialed 1234, the translation will produce a composite number such as 950-1234. The NXX digits used, such as the exemplary 950 digits, would not correspond to normal exchange digits.

As a result of the translation, the CO switch has now filled its digit register with a complete 7 digit number. When the administrative module processor of the CO examines that number, in an effort to determine how next to proceed, the module processor will recognize that the composite number is an individual dialing plan trigger. Specifically, the administrative module processor of the CO recognizes that it must now obtain information from the centralized database in the ISCP 40. In the present example, the CO recognizes the 950 type NXX code with attached four dialed digits as an AIN trigger and initiates a query and response procedure to access data in the ISCP (step S8).

Specifically, the originating CO suspends the call and sends a query message up to the ISCP 40 through the STP's (see FIG. 1). This query message, in TCAP format, identifies the calling station and includes the seven digit composite Centrex number produced by the translation step S7 in the CO along with an indicator stating that the call is an "on net" call which does not conform to the Nation Dialing Pattern. As noted above, this seven digit number includes the actual extension number digits dialed. Based on the last four digits, the ISCP 40 retrieves from its database the complete telephone number of the called station corresponding to the dialed extension number.

The ISCP returns the destination number to the originating CO in step S9. Specifically, the ISCP 40 formulates a response message, again in TCAP format, including the complete destination number and any other routing information which might be necessary to complete the call. The ISCP transmits the response message back to the originating central office via the STP(s).

The destination number could theoretically be any number, American or International. The administrative module processor replaces the 7 digit number in its register with the destination number received from the ISCP. The administrative module processor uses the destination number in the register, together with any routing information received form the ISCP, to complete the call through the public switched telephone system in an otherwise normal manner (step S4), and call processing ends at step S5.

Centrex Extend Call Processing—Second Embodiment

Figure 4:
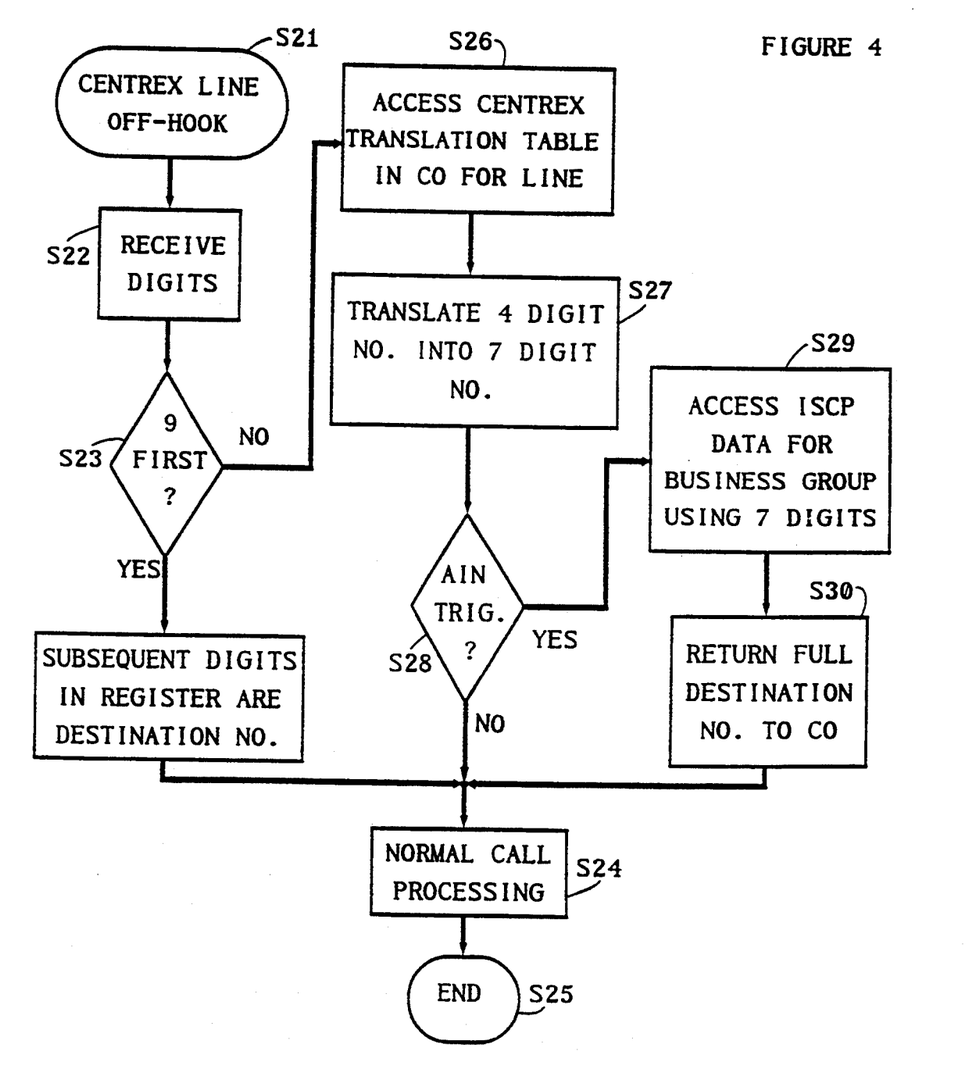
FIG. 4 is a flow chart depicting a second, alternative, example of call processing for extension number dialing in accord with the present invention.

FIG. 4 is a simplified flow diagram illustrating a second embodiment of call processing for extension number dialing in accord with the present invention. In the first call processing embodiment discussed above, all extension number calls from a Centrex Extend line triggered an AIN type query and response procedure to obtain the complete destination number from the ISCP 40. For many calls, however, the destination station will be one of the customer's stations within the same building or complex from which the call originates. Consequently, the destination number will often identify a line served by the same CO switch. As will become apparent from the detailed description below, the second call processing embodiment relies on the Centrex translation tables within the connected CO to translate extension numbers into telephone numbers for destination lines connected to the particular switch. Consequently, access to the ISCP is required only when the extension number corresponds to a line connected to a remote CO switch.

With specific reference to FIG. 4, Centrex Extend call processing begins when a Centrex customer takes the station set off-hook (step S21). Otherwise, if a subscriber takes the station set on a non-Centrex line off-hook, the switch will process that subscriber's call in a normal manner. Again the recognition of whether a particular off-hook line is a Centrex line or not is based on translation information stored in the disc storage 63 and transferred into an assigned portion of the call store 67 when the subscriber initially takes the station off-hook.

The administrative module processor 61 also opens an internal register (not shown) for collecting dialed digits. If the information in the call store 67 for the off-hook line indicates that the line is a Centrex line, the translation information provides the Centrex access code which is loaded into the digit register. In step S22 the connected CO receives dialed digits on the off-hook Centrex line, and the administrative module processor 61 of that switch loads the received digits into the open register containing the Centrex access code.

Next, at step S23, the administrative module processor of the connected CO checks to see if the first dialed digit is a 9. If 9 is dialed first, the switch recognizes the subsequently dialed digits as a destination number and uses those digits to set up an outgoing direct dialed call using normal call processing routines (step S24). Call processing ends at step S25. If at step S23 the CO switch determines that the first dialed digit is not a 9, the switch knows that the caller intends to use an individual dialing plan, therefore call processing branches to step S26.

As noted in the discussion of FIG. 3 supra, other branching procedures, such as a digit collection and time out analysis, can be used in the decision in step S23. Like the discussion of FIG. 3, it will again be assumed that the particular subscriber has elected a four digit dialing plan, however, other numbers of digits, e.g. three or five, can be used.

In step S26, the administrative module processor of the connected CO uses the Centrex code and dialed extension number to access its stored Centrex translation table associated with the off-hook line. Using the accessed data, the processor translates the 4 digit extension number dialed by the caller into a 7 digit Centrex number. The steps S21 to S27 in the FIG. 4 embodiment essentially correspond to the steps S1 to S6 in the FIG. 3 embodiment. Step S27 is similar to step S7 in FIG. 3, but the data used in the translation in step S27 is somewhat different.

In this embodiment, the translation data stored by the CO identifies all connected lines which belong to the business subscriber assigned to the particular off-hook line. As such, the connected CO knows the direct dial telephone numbers of all of the customer's lines connected to that switch. If the extension number dialed corresponds to a line connected to the same CO as the off-hook Centrex Extend line, the translation data in the administrative module 55 identifies the full telephone number of the destination line. Only if the extension number corresponds to a remote line connected to a different CO switch will the Centrex number produced by the translation in step S27 have the digit format for triggering AIN processing discussed above.

Thus, If the extension number dialed corresponds to a line connected to the same CO as the off-hook Centrex Extend line, the translation in step S27 will produce a 7 digit Centrex number identifying an actual destination station. The administrative module processor replaces the digits in the register with the complete 7 digit number produced by the translation in Step S27.

At step S28 the administrative module processor examines the digits in the register to determine if the number is an AIN triggering number, e.g. having NXX digits, such as the exemplary 950 digits, which do not correspond to normal exchange digits. If the digits in the register do not constitute an AIN trigger, then the digits represent an actual destination number. Accordingly, the switch uses the digits now contained in the register to set up an outgoing direct dialed call using normal call processing routines (step S24). Call processing ends at step S25.

If the dialed extension digits represent a station connected to a remote CO, the translation in step S27 will produce a 7 digit Centrex number including the dialed digits at the end. However, the first digits of the number will consist of NXX digits such as 950 which will cause AIN triggering, as discussed below.

As a result of the translation, the CO switch has now filled its digit register with a complete 7 digit number. When the CO examines that number in an effort to determine how next to proceed (step S28), however, the CO will recognize that the composite number is an individual dialing plan type AIN trigger. Specifically, the CO recognizes that it does not yet have enough information to route to an actual destination line but must now obtain information from the centralized database in the ISCP 40. In the example given, the CO recognizes the 950 NXX code with attached four dialed digits as an AIN trigger and initiates a query and response procedure to access data in the ISCP. With reference to the flow chart of FIG. 4, at step S28 the CO switch determines that the digits in the register are an AIN trigger, and call processing extends to step S29. The CO initiates a query and response procedure to access data in the ISCP (step 29) using the 7 digits produced by the translation in step S27.

As in the first call processing embodiment, in step S29 the originating CO suspends the call and sends a query message up to the ISCP 40 through the STP's. This query message, in TCAP format, identifies the calling station and includes the seven digit number produced by the translation in the CO. As noted above, this seven digit number includes the actual extension number digits dialed. Based on the identity of the business group determined by the calling party's line identification, the ISCP retrieves from its database the complete telephone number of the called station corresponding to the dialed extension number.

The ISCP returns the destination number to the originating CO in step S30. Specifically, the ISCP 40 formulates a response message, again in TCAP format, including the complete destination number and any other routing information which might be necessary to complete the call. The ISCP transmits the response message back to the originating central office via the STP(s).

The destination number could theoretically be any number, American or International. The administrative module processor replaces the 7 digit composite number in its register with the received destination number. The CO uses the received destination number and any routing information received from the ISCP to initiate the call through the public switched telephone system in an otherwise normal manner (step S24), and call processing ends at step S25.

Routing Control

To provide economics or efficiencies in traffic handling, the Centrex Extend service will route calls to different customer locations based on customer specified parameters, such as calling/called party number, time-of-day, day of the week, authorization codes, etc. Specifically, when the database in the ISCP is accessed in step S8 in FIG. 3 or in step S29 in FIG. 4, the ISCP retrieves from the particular customer portion of the database a table of trunk group routing information. The TCAP response message with the destination number, returned to the originating CO in step S9 or S30 includes appropriate routing instructions.

In one example, the routing control information stored in the ISCP database would specify three trunk groups, in priority order. For example, the first trunk group might be a group of private tie lines, the second trunk group might be AT&T WATS lines and the third might be through MCI trunk lines. Upon receiving the TCAP response message including the identification of the three trunk groups in priority order, the central office would use the highest priority trunk group then available to complete the call, and if all specified trunk groups are busy, complete the call through the standard direct dial telephone network.

The Centrex Extend system can provide customers other types of routing control routines, as desired by each customer. Instead of specifying priority order, the stored data might identify different trunk groups for use at different times of day. The TCAP response then would identify a single trunk group, based on the current time, which the switch would then use to complete the call. Also, instead of specifying private trunk groups, such as tie lines, the stored routing data could specify one or more trunk groups, or even individual trunk circuits, through the public switched telephone network itself. The programmability of the customer's stored data in the ISCP allows each customer a virtually unlimited selection of routing control routines, so that each business can customize its routing control to match its available trunk resources and its communication needs.

The call routing control therefore allows a business customer to control use of available long distance resources to reduce costs. Provision of this service through the Centrex Extend facilitates such resource control across a number of central office switches. Setting up or modifying the routing priority requires only programming the one central database in the ISCP.

Dialing Options

The Centrex Extend system can support a wide variety of individual dialing plans which different business customers may select. Two dialing plan options, location code dialing and portable intercom dialing, are of particular interest and will be discussed in detail below.

Location Dialing

For the location code dialing option, one or more leading dialed digits indicate a particular subscriber location, and the last four digits correspond to the station's North American Numbering Plan (NANP) telephone number. This dialing scheme permits duplication of extensions among locations served by different switches, and the subscriber is not limited to 10,000 stations. For this option, however, the caller must be aware of the geographic location of the called Area Wide Centrex station.

In the example discussed above John Doe's office in Washington was assigned extension number 1234. If the Washington offices of the company are designated by the numeral 2, any employee calling John would dial 21234. Another employee in Richmond would also have the 1234 extension number. The Richmond facilities, however, would have a different location code, e.g. the numeral 3. Any employee calling the other employee in Richmond therefore would dial 31234.

Portable Intercom Number Dialing

The Portable Intercom Number Dialing option allows a customer to assign a "private number" independent of the NANP number to each of the customer's Centrex Extend stations. This dialing plan is like a private network numbering plan, where the users call private numbers, but outside callers dial the full NANP number to reach a Centrex station. With this dialing option, when a user moves from one location to another, his/her NANP number would change but not the assigned private number. This allows internal calls within the customer's Centrex Extend group to reach the end user using the same private number, while outside callers would have to dial the NANP number assigned to the new location.

Assume for purposes of discussion that the call processing routine of FIG. 3 is used. In the example of FIG. 1, employee John Doe is initially located in the Washington, D.C. area. John is assigned extension number 1234, but his actual telephone number is 201-456-7890. To call John Doe, any other employee of company X dials only extension number 1234, and the ISCP provides the complete 703-456-7890 number as part of the call processing shown in FIG. 3, to allow the public switched network to complete each call to station A. Now John Doe moves to other offices of the company in Richmond, and can be reached at station C on the line connected to SSP-CO 13. His actual telephone number becomes 804-234-5678. The database at the ISCP is revised to indicate John Doe's new location. Subsequently, employees of company X need only dial the same old extension number 1234, and the ISCP provides the new complete number 804-234-5678 allowing call connection to the actual station C at John Doe's new location.

In one implementation, the changes in the data base will probably be made manually by a telephone company technician. Specifically, a technician operating the ISCP 40 would enter changes in the assignment of extension numbers to corresponding NANP numbers. The customer would ask the telephone operating company for a change, and the operating company would issue a service order to the technician for each change. The technician would then use the SCE terminal 42 to actually enter the changes into the data base.

If extreme flexibility were desired, an appropriate automated voice response system could be provided. The voice response system would provide synthesized speech prompts and accept DTMF inputs to allow individual employees to call in and enter their own changes in the ISCP. Under this approach, the extension number assignment would be quite dynamic and could track even short term movements of the employees.

In another implementation, John Doe would have the ability to use DTMF control of the terminating information in the ISCP and be capable of changing the 10 digit terminating information without aid of telephone company technicians. John Doe would only have access to his/her specific 10 digit terminating information.

In the preferred implementation, each business customer will have a single terminal, and would call in and establish a data link to the ISCP via modems. Typically, the terminal would be assigned to a corporate communications officer, and only that officer would have access to the customer's call processing records resident in the data base through the terminal. Security is controlled through the terminal and/or the line from which the terminal calls in to the ISCP. The terminal may have a built in security code which the ISCP verifies before granting access to the data base, or the ISCP may check the originating telephone number and the terminal identity number against a stored number from which that terminal is expected to call. The corporate business officer might also have an assigned personal identification number (PIN). This single terminal per customer approach allows the customer to change the numbering data fairly frequently, but limits access to the data base to one customer representative and thereby reduces the potential for unauthorized access to sensitive data.

In the preferred implementation, the corporate officer obtains direct access through the terminal to all of the programming in the data base associated with that business customer. Among other changes, the corporate officer would then have the ability to change the assignment of extension numbers to corresponding NANP numbers. To move an extension number with movement of an 35 employee, the employee might call the corporate communication officer and describe the move. The officer then accesses the ISCP through the terminal and effects the desired change.

Call Transfer

Another feature offered with Centrex Extend service is call transfer. This feature allows transfer of an existing call connection from one member of the business group of lines to any other member of the group, regardless of which central office each member connects to.

Figure 5:
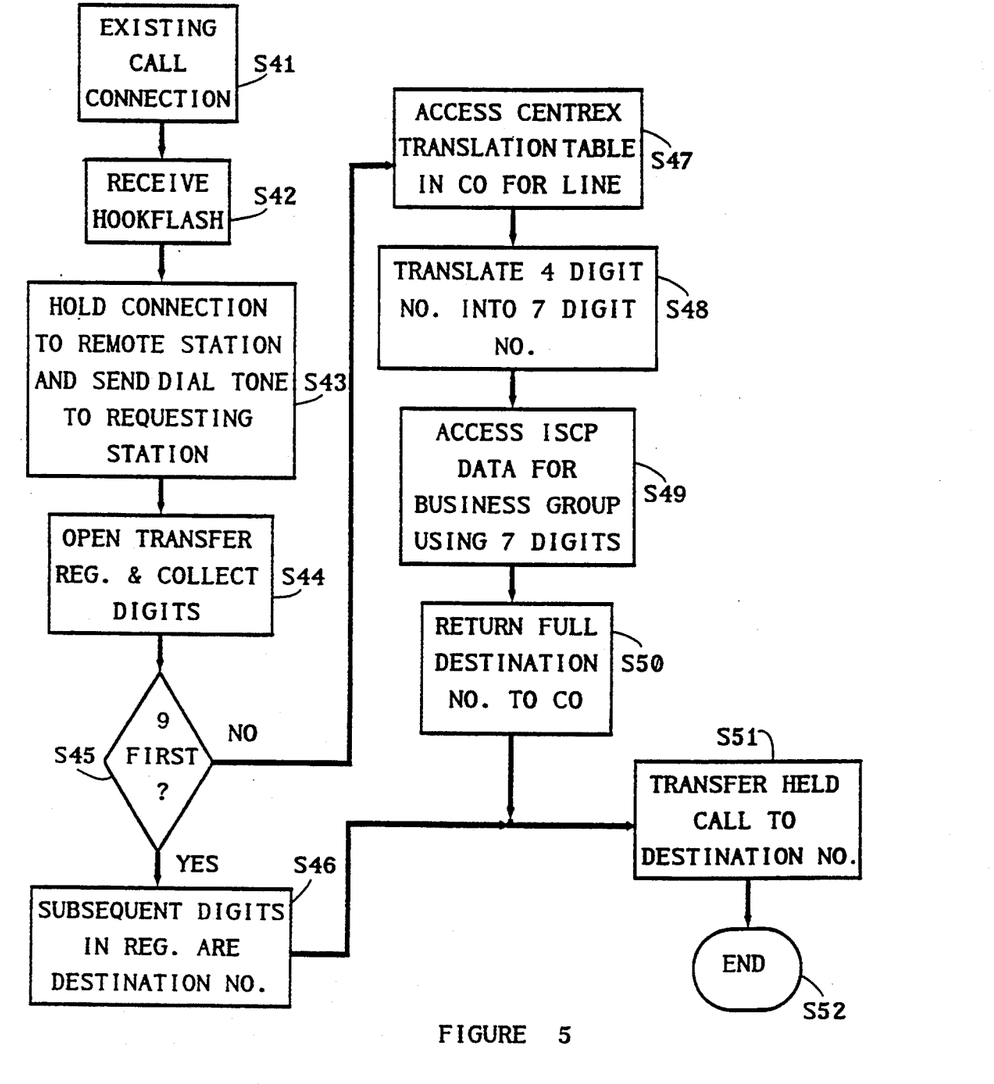
FIG. 5 is a flow chart depicting one example of a call transfer routine using the extension number processing for the present invention.

With reference to the flow chart of FIG. 5, a call connection exists through at least one of the central office switching systems to one of the local telephone lines designated as a member of the group (see step S41). During this connection, the system receives a transfer request from the one local telephone line. The transfer request will typically begin with a switch hookflash (step S42).

The central office connected to the line requesting transfer recognizes that the service request originates from a line which is a member of the business group, places the existing call on hold, and sends a dial tone to that line (step S43). As in the extension dialing routines, the central office recognizes that the line is a Centrex line assigned to the business group based on translation data stored in the central office switching system. More specifically, the administrative module processor of the connected CO (FIG. 2) identifies the line and uses the line identification to load various relevant translation information regarding the line from disc storage 63 into a portion of the call store 67 which is assigned to the line for the duration of processing of the particular call transfer operation.

The administrative module processor 61 also opens an internal register for collecting dialed digits. Here the register serves as a "transfer" register (see step S44). The information in the call store 67 for the line requesting transfer will indicate that the line is a Centrex line. The translation information for that line therefore provides the Centrex access code which is loaded into the transfer register. The central office receives dialed digits identifying the transfer destination, and the digits are loaded into the transfer register.

At step S45, the administrative module processor of the connected CO checks to see if the first dialed digit stored in the transfer register is a 9. If 9 is dialed first, the switch recognizes the subsequently dialed digits held in the register as a destination number (step S46) and uses those digits to transfer the call to the identified destination (step S51). Call processing ends at step S52. If at step S45 the CO switch determines that the first dialed digit is not a 9, the switch knows that the caller intends to use an extension number to identify the transfer destination, therefore call processing branches to step S47.

As noted in the discussions of FIGS. 3 and 4 supra, other branching procedures, such as a digit collection and time out analysis, can be used in the decision in step S45. Like the discussions of those earlier figures, it will again be assumed that the particular business subscriber has elected a four digit dialing plan, however, other numbers of digits, e.g. three or five, can be used as extension numbers. The call transfer routine of FIG. 5 could use either of the optional extension number dialing plans discussed in the preceding section.

In step S47, the administrative module processor of the connected CO uses the Centrex code and dialed digits to access its internal Centrex translation table associated with the off-hook line from storage. Using the accessed data, the processor translates the 4 digit extension number dialed by the caller into a 7 digit Centrex number. For purposes of further discussion, it will be assumed that the switching system connected to the line requesting transfer processes dialed extension numbers in accord with the routine shown in FIG. 3. As such, the translations in step S48 will produce a 7 digit AIN triggering number, as discussed below. The system could as easily operate in accord with the routine of FIG. 4 so as to rely on the Centrex translation tables within the connected CO to translate extension numbers into telephone numbers for destination lines connected to the particular switch and trigger AIN type access to the ISCP for transfer destination numbers only when the extension number for transfer corresponds to a line connected to a remote CO switch.

In the specific example shown in FIG. 5, after the translation in step S48 the CO switch has filled its digit register with a complete 7 digit number which the CO recognizes as an AIN trigger. Continuing with the example used above, the NXX portion of the 7 digit composite number would not correspond to a normal exchange code, e.g. the NXX portion would equal 950. The CO would recognize that it does not yet have enough information to transfer the call to an actual destination line but must now obtain information from the centralized database in the ISCP 40. The CO initiates a query and response procedure to access data in the ISCP (step S49) using the 7 digits produced by the translation in step S27.

As in the extension number dialing embodiments, in step S29 the originating CO suspends the call and sends a query message up to the ISCP 40 through the STP's. This query message, in TCAP format, identifies the calling station and includes the seven digit number produced by the translation in the CO. As noted above, this composite 7 digit number includes the actual 4-digit extension number digits dialed. Based on the identity of the business group determined by the calling party's line identification, the ISCP accesses a data table for the business group to obtain call processing data to transfer connection from the requesting line to the other line identified by the 4 digit extension number dialed by the requesting party. The retrieved call processing data would include the complete telephone number of the destination line.

The ISCP returns the retrieved call processing data, including the complete transfer destination number, to the originating CO in step S50. Specifically, the ISCP 40 formulates a response message, again in TCAP format, including the retrieved call processing data. The ISCP transmits the response message back to the originating central office via the STP(s). The administrative module processor replaces the digits in the transfer register with the destination number. The central office then uses the call processing data received from the ISCP to transfer the original call (previously placed on hold) to the line identified by the full destination number (step S51), and call processing ends at step S52. Again, the destination number could theoretically be any number, American or International.

In the example of FIG. 1, suppose that employee John Doe uses station A in the Washington area. Station A is assigned extension number 1234, but has an actual telephone number of 703-456-7890. Employee Jane Smith in the company's offices in Richmond uses station C and is engaged in a telephone conversation with an outside party. Jane Smith decides to transfer the call to John Doe. Jane Smith flashes the hookswitch on her telephone and hears a new dial tone. She then dials John Doe's extension number 1234. The ISCP would provide the complete 703-456-7890 number and the system uses that number to transfer the existing connection to the outside party to John Doe's telephone line (to station A) in the Washington office.

Alternate Network Architectures

The Advanced Intelligent Network architecture illustrated in FIG. 1 is the preferred embodiment of telephone networks for practicing the present invention. However, a variety of other intelligent network architectures may be used.

For example, none of the end office switches may have SSP functionality. Instead, each end office would connect to a trunk tandem which in turn feeds calls to a central SSP capable switch. Each end office would still maintain the Centrex translation tables for the lines connected thereto, but the number produced by translation of the dialed extension digits into a full set of seven or ten digits would cause routing through the tandem to the central SSP, which would recognize the translating routing number as an AIN trigger. The central SSP then communicates with the ISCP, as in the implementation described above, but in this case via an SS#7 type CCIS link.

In another intelligent network embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIG. 1. For those end offices which lack SSP capability, after translation to a full seven or ten digit number, calls are forwarded to the SSP capable trunk tandem which in turn relays data to and from the ISCP. In these alternate embodiments, the SSP capable trunk tandem switches are digital switches, such as the 5ESS switch from AT&T; and the non-SSP type end offices might be 1A analog type switches.

As another alternative, the intelligent network architecture could use distributed intelligences rather than the single Integrated Services Control Point (ISCP) of FIG. 1. In such a network, the SSP's connect to an STP which routes data signalling type communications between the SSP's, between the SSP's and distant offices, and between the SSP's and an SCP. In this case, however, the SCP is essentially only a computerized database. Actual call processing is largely controlled by a Service Circuit Node (SCN). The SCP in turn connects to a Service Management System (SMS). The SCP and the SCN are both connected to a Service Management System (SMS). All new or modified service data is input through a Service Creation Environment (SCE), and a validation process within the SMS checks the input data for completeness and compatibility with the existing programs of the network. The service data is then loaded as necessary into the SCP database, and as needed into the Service Circuit Node (SCN). The SCN connects via a direct voice and data signalling link to the SSP type switch, and is typically an adjunct processor device directly associated with one of the switches. The SCN stores the actual control programs and many of the look up tables for controlling actual call processing. In this type of intelligent network, one of the SSP's will recognize a number, e.g. the number produced after translation of the dialed extension number into a seven or ten digit number, as a triggering event and launch a TCAP query through the STP to the SCP, in a manner similar to that discussed above with regard to FIG. 1. The SCP checks its data to determine that the caller is a customer and determines what general type of service the caller has requested. The SCP transmits a "SEND to RESOURCES" message back to the originating SSP instructing that SSP to access a channel to the SCN. The SCP also sends a message through the SMS and an X.25 packet switched data network to the SCN telling the SCN what type of call processing routine to execute. As needed, the SCN looks up information in its data tables relating to the call, and the SCN decides how to complete the call without further reference to the SCP. For interactive processing, playing announcements to the caller and collecting digits, the SCN may include an announcement frame, or the SCN may connect to a peripheral announcement platform.

From the above detailed description, it should be clear that the methods and systems disclosed herein extend a variety of Centrex service features to customer facilities connected to different central offices. The Centrex Extend approach, however, does not require that the Centrex lines be devoid of switch provided special services, such as call forwarding and call pickup. Also, the call processing routines permit provision of extension number based services using existing central offices (CO's) and a centralized database (SCP), without requiring dialing of seven or ten digit extension numbers.

The above discussion of the best modes of practicing the invention are intended as examples only. The appended claims define the scope of patent protection.

We claim:

1. A telephone system comprising:
a plurality of telephone switching offices for selectively providing switched telephonic communication services over a plurality of telephone lines connected thereto, at least one of the telephone lines connected to each of the telephone switching offices being designated as members of a business group;
a central control separate from the telephone switching offices, said central control sending data to and receiving data from the telephone switching offices to control at least some switching operations thereof;
each of the telephone switching offices including means for storing Centrex translation data;
said central control storing translation data for translating extension numbers consisting of a predetermined number of digits fewer than a minimum number of digits necessary to completely identify a telephone line into a number of sufficient digits to identify a telephone line, wherein:
in response to a request for service including a dialed extension number received via a first one of the telephone lines of said business group, the telephone switching office which is connected to the first telephone line accesses the means for storing Centrex translation data to convert the dialed extension number into a composite number of at least said minimum number of digits, said composite number including the dialed extension number,
the switching office connected to the first telephone line transmits the composite number to the central control, the central control accesses stored translation data associated with the business group and uses the accessed data to translate the extension number included in the composite number into a destination number identifying a second one of the lines of said business group and transmits the destination number to the telephone switching office connected to the first telephone line, and the telephone switching office connected to the first telephone line initiates establishment of a telephone connection to a second one of the telephone lines of the business group identified by the destination number.

2. A system as in claim 1, wherein the telephone connection is established between the first and second telephone lines of the business group.

3. A system as in claim 2, wherein the telephone connection is established via the telephone switching office connected to the first telephone line and another one of the telephone switching offices.

4. A system as in claim 1, wherein the telephone connection is established by transferring an existing connection from the first telephone line of the business group to the second telephone line of the business group.

5. A communication system comprising:
 a plurality of switching offices for selectively providing switched communication services over a plurality of communication lines connected thereto, at least one of the communication lines connected to each of the switching offices being designated as members of a business group;
 a central control separate from the switching offices, said central control sending data to and receiving data from the switching offices to control at least some switching operations thereof;
 at least a first one of the switching offices including means for storing Centrex translation data;
 said central control storing translation data for translating extension numbers consisting of a predetermined number of digits fewer than a minimum number of digits necessary to completely identify a communication line into a number identifying a communication line, wherein:
 in response to a request for service received via a first one of the lines of said business group, said request for service including a dialed extension number consisting of the predetermined number of digits, the first switching office accesses the means for storing Centrex translation data to convert the dialed extension number to a Centrex number of at least said minimum number of digits, said Centrex number including the dialed extension number,
 the first switching office transmits the Centrex number to the central control,
 the central control accesses stored translation data associated with the business group and uses the accessed data to translate the Centrex number into a destination number identifying a second one of the lines of said business group and transmits the destination number to the first switching office, and
 the first switching office uses the destination number to provide a switched communication service.

6. A system as in claim 5, wherein the communication lines are telephone lines.

7. A system as in claim 6, wherein the switching offices are program controlled telephone office switching systems.

8. A system as in claim 6, wherein the switching offices are end office switching systems.

9. A system as in claim 5, wherein the central control comprises an integrated services control point.

10. A system as in claim 9, wherein said integrated services control point comprises:
 (i) a database storing said extension number translation data;
 (ii) a service management system connected to said database, and
 (iii) a data and reporting system for capturing and storing a data record relating to operations of said central control.

11. A system as in claim 10, wherein said integrated services control point further comprises a service creation environment terminal subsystem for programming the data base.

12. A system as in claim 5, wherein the provided switched communication service comprises a two-way communication service between the first line and the second line.

13. A system as in claim 12, wherein the second line connects to a second one of the switching offices and the first and second switching offices provide a switched two-way communication connection between the first line and the second line.

14. A system as in claim 5, wherein the provided switched communication service comprises a transfer of a communication connection from the first line to the second line.

15. In a communication system comprising:
 at least two switching offices for selectively providing switched communication services over a plurality of communication lines connected thereto, at least one of the communication lines connected to each of the switching offices being designated as members of a business group;
 a central control separate from the switching offices, said central control sending data to and receiving data from the switching offices to control at least some switching operations thereof, said central control storing translation data for translating extension numbers consisting of a predetermined number of digits fewer than a minimum number of digits necessary to completely identify a communication line into a number identifying a communication line, a call processing method comprising the steps of:
 receiving a request for service via a first one of the lines of said business group, said request for service including a dialed extension number consisting of the predetermined number of digits;
 accessing Centrex translation data stored in the switching office connected to the first line to convert the dialed extension number to a composite number of at least said minimum number of digits, said composite number including the dialed extension number;
 transmitting said composite number to the central control;
 accessing the translation data stored in the central control to translate the extension number included in the composite number into a destination number identifying a second one of the lines of said business group;
 transmitting the destination number to the switching office connected to the first line; and providing a switched communication service using the destination number.

16. A method as in claim 15, wherein the step of providing a switched communication service comprises forming a two-way communication connection between the first line and the second line.

17. A method as in claim 15, wherein the switching offices are telephone switching systems and the two-way communication connection is a telephonic connection.

18. A method as in claim 15, wherein the step of providing switched communication service comprises transferring of a communication connection from the first line to the second line.

19. In a communication system comprising:
 first and second switching offices for selectively providing switched communication services over a plurality of communication lines connected thereto, at least one of the communication lines connected to each of the first and second switching offices being designated as members of a business group;
 a central control separate from the first and second switching offices, said central control sending data to and receiving data from the first and second switching offices to control at least some switching operations thereof, said central control storing translation data for translating an extension number consisting of a predetermined number of digits fewer than a minimum number of digits necessary to completely identify a communication line into a number identifying a communication line, a call processing method comprising the steps of:
 (a) receiving a request for service at the first switching office via a first line of said business group which is connected to the first switching office, said request for service including a dialed extension number consisting of the predetermined number of digits;
 (b) accessing Centrex translation data stored in the first switching office to convert the dialed extension number to a composite number of at least said minimum number of digits;
 (c) if the composite number identifies a second line of the business group connected to the first switching office, providing a switched communication service via the first switching office using the composite number; and
 (d) if the composite number does not identify a line of the business group connected to the first switching office,
  (i) transmitting said composite number to the central control;
  (ii) accessing the translation data stored in the central control to translate the composite number into a destination number identifying a line of said business group connected to the second switching office;
  (iii) transmitting the destination number to the first switching office; and
  (iv) providing a switched communication service via the first and second switching offices using the destination number.

20. A method as in claim 19, wherein the step of providing a switched communication service via the first switching office using the composite number comprises forming a two-way communication connection between the first line of the business group connected to the first switching office and the second line of the business group connected to the first switching office.

21. A method as in claim 20, wherein the two-way communication connection is a telephone connection.

22. A method as in claim 19, wherein the step of providing a switched communication service via the first switching office using the composite number comprises transferring a communication connection from the first line of the business group connected to the first switching office to the second line of the business group connected to the first switching office.

23. A method as in claim 19, wherein the step of providing a switched communication service via the first and second switching offices comprises forming a two-way communication connection between the first line of the business group connected to the first switching office and the line of the business group connected to the second switching office.

24. A method as in claim 23, wherein the two-way communication connection is a telephone connection.

25. A method as in claim 19, wherein the step of providing switched communication service via the first and second switching offices comprises transferring a communication connection from the first line of the business group connected to the first switching office to the line of the business group connected to the second switching office.

26. A method as in claim 19, wherein the first switching office is an end office telephone switching system.

27. A method as in claim 19, wherein the composite number includes the dialed extension number.

28. In a communication system comprising:
 a plurality of switching offices for selectively providing switched communication services over a plurality of communication lines, at least one of the communication lines being connected to each of two of the switching offices and being designated as members of a business group;
 a central control separate from the switching offices, said central control sending data to and receiving data from the switching offices to control at least some switching operations thereof, a call processing method comprising the steps of:
 receiving a request for service via a first one of the lines of said business group at one of the switching offices, said request for service including a dialed extension number consisting of a predetermined number of digits fewer than a minimum number of digits necessary to completely identify a communication line;
 accessing Centrex translation data stored in the one switching office to convert the dialed extension number to a Centrex number of at least said minimum number of digits;
 in response to the Centrex number, triggering transmission of said Centrex number to the central control;
 using translation data stored in the central control to translate the Centrex number into a destination number of at least said minimum number of digits, the destination number identifying a second one of the lines of said business group;
 transmitting the destination number to the one switching office; and
 providing a switched communication service using the destination number.

29. A method as in claim 28, wherein the Centrex number is an individual dialing plan number.

30. A method as in claim 28, wherein the Centrex number includes the dialed extension number.

31. A method as in claim 30, wherein the dialed extension number is appended with a location code.

32. A method as in claim 30, further comprising the step of modifying the translation data stored in the central control such that a subsequent translation of the Centrex number will produce a different destination number.

33. In a communication system comprising:

a plurality of switching offices for selectively providing switched communication services over a plurality of communication lines, at least one of the communication lines being connected to each of two of the switching offices and being designated as members of a business group;

a central control separate from the switching offices, said central control sending data to and receiving data from the switching offices to control at least some switching operations thereof, a call processing method comprising the steps of:

receiving a request for service via a first one of the lines of said business group at one of the switching offices, said request for service including a dialed extension number consisting of a predetermined number of digits fewer than a minimum number of digits necessary to completely identify a communication line;

accessing Centrex translation data stored in the one switching office to convert the dialed extension number to a Centrex number of at least said minimum number of digits;

if the Centrex number does not identify a communication line connected to the one switching office:
 (i) triggering transmission of said Centrex number to the central control,
 (ii) using translation data stored in the central control to translate the Centrex number into a destination number of at least said minimum number of digits, the destination number identifying a second one of the lines of said business group,
 (iii) transmitting the destination number to the one switching office, and
 (iv) providing a switched communication service using the destination number; and if the Centrex number identifies a communication line connected to the one switching office, providing a switched communication service using the Centrex number.

34. A method as in claim 33, wherein if the Centrex number does not identify a communication line connected to the first switching office, the Centrex number is an individual dialing plan number.

35. A method as in claim 33, wherein the Centrex number includes the dialed extension number.

36. A method as in claim 35, wherein the dialed extension number is appended with a location code.

37. A method as in claim 35, further comprising the step of modifying the translation data stored in the central control such that a subsequent translation of the Centrex number will produce a different destination number.

* * * * *